United States Patent
Matt et al.

(10) Patent No.: US 6,324,684 B1
(45) Date of Patent: Nov. 27, 2001

(54) PROCESSOR HAVING REAL-TIME EXECUTION CONTROL FOR DEBUG FUNCTIONS WITHOUT A DEBUG MONITOR

(75) Inventors: David R. Matt, Missouri City; Gary L. Swoboda, Sugarland, both of TX (US); Karthikeyan Madathil, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/273,039

(22) Filed: Mar. 19, 1999

Related U.S. Application Data
(60) Provisional application No. 60/078,785, filed on Mar. 20, 1998.

(51) Int. Cl.⁷ .................................................. G06F 9/44
(52) U.S. Cl. .................................. 717/4; 714/38; 714/34
(58) Field of Search .................................. 714/25, 38, 34, 714/31; 717/4; 712/36; 395/500

(56) References Cited

U.S. PATENT DOCUMENTS

| | | | | |
|---|---|---|---|---|
| 4,631,361 | * | 12/1986 | Miller ................................. | 379/351 |
| 5,140,671 | * | 8/1992 | Hayes et al. ........................ | 706/60 |
| 5,394,544 | * | 2/1995 | Motoyama et al. .................. | 714/31 |
| 5,488,688 | * | 1/1996 | Gonzales et al. .................... | 714/34 |
| 5,689,684 | * | 11/1997 | Mulchandani et al. ............... | 395/500 |
| 5,737,516 | * | 4/1998 | Circello et al. ...................... | 714/38 |
| 5,828,824 | * | 10/1998 | Swoboda ............................ | 714/25 |
| 5,943,498 | * | 8/1999 | Yano et al. ........................... | 717/4 |
| 5,978,902 | * | 11/1999 | Mann ................................. | 712/227 |
| 6,055,619 | * | 4/2000 | North et al. .......................... | 712/36 |
| 6,070,218 | * | 5/2000 | Giles et al. .......................... | 710/260 |
| 6,079,032 | * | 6/2000 | Peri .................................... | 714/38 |
| 6,081,783 | * | 6/2000 | Divine et al. ........................ | 704/500 |
| 6,081,885 | * | 6/2000 | Deao et al. .......................... | 712/227 |
| 6,094,729 | * | 7/2000 | Mann ................................. | 714/25 |
| 6,145,123 | * | 11/2000 | Torrey et al. ........................ | 717/4 |
| 6,154,856 | * | 11/2000 | Madduri et al. ..................... | 714/27 |
| 6,202,104 | * | 3/2001 | Ober .................................. | 710/18 |
| 6,249,907 | * | 6/2001 | Carter et al. ........................ | 717/4 |
| 6,256,777 | * | 7/2001 | Ackerman ........................... | 717/4 |
| 6,260,150 | * | 7/2001 | Whilehelmus et al. .............. | 713/323 |
| 6,286,132 | * | 4/2001 | Tanaka et al. ....................... | 717/4 |

OTHER PUBLICATIONS

Title Ddbx–LPP; A dynamic software tool for debugging asynchronous distributed algorithms on loosely coupled parallel processors, author: Gernandez et al, source J Syst Software, 1993.*

Next Generation Background Debug, Class #345 ESC '97 West, by James M. Sibigtroth, Motorola Microcontroller Technologies Group, Austin, Texas.

* cited by examiner

Primary Examiner—Tuan Q. Dam
Assistant Examiner—Chameli Chaudhuri Das
(74) Attorney, Agent, or Firm—W. Daniel Swayze, Jr.; W. James Brady; Frederick J. Telecky, Jr.

(57) ABSTRACT

A processor (16) is disclosed that has real-time execution control for debug functions. The processor (16) includes processor circuitry operable to execute embedded code (19) where the embedded code includes background code and foreground code. The processor (16) also includes debug circuitry interfacing with the processor circuitry and operable to communicate with a debug host (12). The debug circuitry is operable to receive a debug halt command from the debug host (12). After receipt of the debug halt command, the processor circuitry is operable to suspend execution of the embedded code (19) to allow debug of the embedded code (19). The processor circuitry is further operable, while execution of the embedded code (19) is suspended, to respond to an enabled interrupt by executing foreground code associated with the enabled interrupt. In one embodiment, the debug circuitry has a run state machine indicating execution control directives by the debug host, and the processor circuitry has an execution state machine indicating execution of instructions by the processor circuitry.

6 Claims, 2 Drawing Sheets

PROCESSOR HAVING REAL-TIME EXECUTION CONTROL FOR DEBUG FUNCTIONS WITHOUT A DEBUG MONITOR

CROSS REFERENCE TO RELATED APPLICATIONS

This application claims benefit of U.S. Prov. No. 60/078,785 filed Mar. 20, 1998.

This application is related to U.S. Provisional patent application Ser. No.: 09/273,031 entitled "Processor Having Real-time External Instruction Insertion for Debug Functions Without a Debug Monitor."

TECHNICAL FIELD OF THE INVENTION

This invention relates in general to the field of embedded processors, and more particularly to a processor having real-time execution control for debug functions without a debug monitor.

BACKGROUND OF THE INVENTION

Embedded processors are widely used in a variety of applications and generally include processor circuitry that executes embedded code to perform desired functions. One type of embedded processor is a microcontroller which can be used, for example, to control the operation of a device, such as a motor. Another type of embedded processor is a digital signal processor (DSP) which can be used, for example, in a variety of communications products, such as cellular phones. The use of an embedded processor to perform desired functions generally requires the development and debug of the embedded code. In many applications, the embedded code includes foreground code for performing time critical tasks and background code for performing administrative or higher level tasks.

For certain applications, it can be particularly important to be able to debug the embedded code using real-time execution control. It can also be important to provide for real-time debug access to registers and memory in an embedded processor without using a debug monitor and without stopping the processor. Real-time execution control allows for the suspension of the embedded processor's execution of a given task while still allowing the processor to continue to service other, time critical tasks. Thus, real-time execution control allows the user of processor development and debug tools to interactively control the execution of embedded code within the system without necessarily interfering with the processor's ability to perform time critical tasks. For example, if embedded code is being debugged in a processor used to control a hard disk drive motor, the processor should not be allowed to stop controlling that motor. Otherwise, the motor may go out of control and destroy the hard disk drive. Thus, it is important to allow the processor to continue to execute the time critical task of controlling the motor while the embedded instruction code is being debugged.

One conventional execution control method is to stop all processor execution upon a break event and not allow for any interrupts to be processed until execution resumes. This approach is taken in stop mode emulation schemes used in some processors. However, this does not allow for controlling the processor's execution in a real-time, embedded system.

Another conventional method is to have a break event trigger a special interrupt which causes the processor to execute an interrupt service routine in which the processor waits for either a command to resume execution or for an enabled, time critical interrupt to occur. This type of interrupt service routine is often referred to as a "debug monitor." Thus, the debug monitor is implemented by code executed by the embedded processor after being placed in a debug state. This debug monitor approach provides a form of execution control and is used in some processors in addition to the use of stop mode emulation schemes.

In this debug monitor method, the special interrupt service routine typically communicates to a debug host through scanable registers. The debug host scans in commands and scans out results. When halted, the processor is actually inside the debug monitor, servicing time critical interrupt service routines while performing commands. Consequently, the debug monitor scheme suffers from problems in that it uses system resources such as program and data memory. In general, on chip memory is very expensive and possibly can be corrupted by the debug monitor. Further, performance overhead due to saving and restoring context is experienced as the debug monitor is entered and exited and time critical interrupts generally have to be blocked during this time period.

SUMMARY OF THE INVENTION

In accordance with the present invention, a processor having real-time execution control without a debug monitor is disclosed that provides advantages over prior processor debug schemes.

According to one aspect of the present invention, the processor includes processor circuitry operable to execute embedded code where the embedded code includes background code and foreground code. The processor also includes debug circuitry interfacing with the processor circuitry and operable to communicate with a debug host. The debug circuitry is operable to receive a debug halt command from the debug host. After receipt of the debug halt command, the processor circuitry is operable to suspend execution of the embedded code to allow debug of the embedded code. The processor circuitry is further operable, while execution of the embedded code is suspended, to respond to an enabled interrupt by executing foreground code associated with the enabled interrupt. In one embodiment, the debug circuitry has a run state machine indicating execution control directives by the debug host, and the processor circuitry has an execution state machine indicating execution of instructions by the processor circuitry.

A technical advantage of the present invention is the implementation of debug functions using debug circuitry built into an embedded processor. The debug functions can allow the processor to be halted in a manner similar to an idle instruction. Normal execution is then suspended, and the processor waits either for a run command sent from a debug host or for an interrupt that is enabled and designated as time critical. After performing any time critical interrupt service routine, the processor can return back to the suspended state.

Another technical advantage is the ability to handle a case where, with multiple sections of time critical code, one section of time critical code can be executed while another is stopped and debugged.

A further technical advantage of the present invention is that it allows for debug of a processor without requiring the code and performance overhead of a debug monitor. This reduces the cost of the processor by eliminating the need for the debug monitor code which typically would consume on-chip memory and add to the overall cost of the processor.

Also, there is no need to consume processor resources (e.g., registers, stack space, or memory) to hold state data during the execution of a debug monitor.

Another technical advantage is that there is no relatively lengthy delay between a break event and an ability to service time critical interrupts due to setup time as occurs with a debug monitor.

Additionally, the present invention allows for the mimicking of a stop mode emulation scheme by indicating that no interrupts (enabled or not) are time critical. This essentially treats stop mode emulation as a subset of real-time emulation.

Further technical advantages of the present invention should be apparent from the drawings, description and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
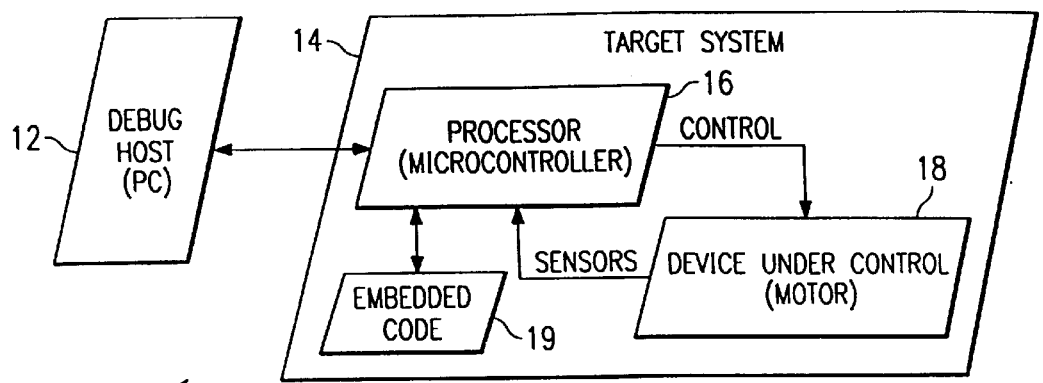
FIG. 1 is a block diagram of one embodiment of a debug environment including a debug host and a target system having an embedded processor.

FIG. 1 is a block diagram of one embodiment of a debug environment, indicated generally at 10, including a debug host 12 and a target system 14. In this embodiment, target system 14 has an embedded processor 16 that provides control signals to and receives sensor signals from a device under control 18. For example, processor 16 can be a microcontroller and device 18 can be a hard disk drive motor. Processor 16 executes embedded code 19 to perform programmed functions. In general, embedded code 19 includes two categories of embedded code: foreground code and background code. The foreground code performs time critical tasks, for example, device control tasks executed at regular intervals to service device 18. The background code performs administrative and higher level tasks, is typically larger in size and is not as time critical.

Figure 2:
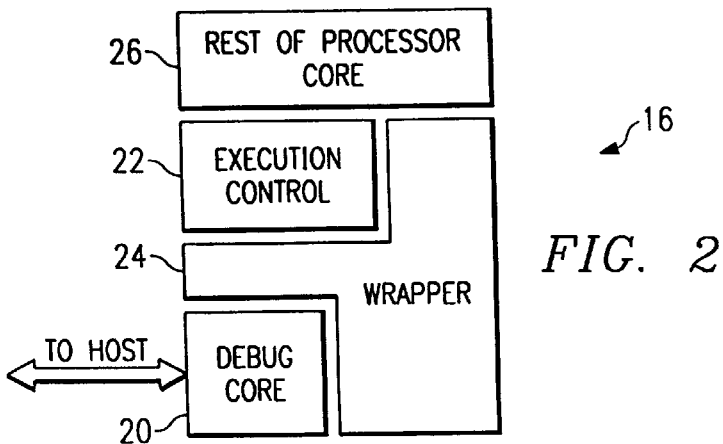
FIG. 2 is a block diagram of one embodiment of debug circuitry in the processor of FIG. 1.

FIG. 2 is a block diagram of one embodiment of debug circuitry in processor 16 of FIG. 1. The debug circuitry includes a debug core 20, execution control 22, and wrapper 24. These components interface with the rest of the processor core 26. Debug core 20 communicates with debug host 12 to receive debug commands and provide results. In one implementation, debug core 20 manages a JTAG TAP state machine for accomplishing communication with debug host 12. Debug core 20 can hold scan registers, contain all TCK logic and manage debug address, data, status and control information. Execution control 22 can then arbitrate between interrupts, instructions and debug and can control suspension and restarting of processor 16. Wrapper 24 can provide an interface for the debug circuitry component to the rest of the processor core 26 and the memory bus.

According to the present invention, the debug circuitry in processor 16 allows debug host 12 to perform real-time execution control for debug functions without using a debug monitor. In general, when processor 16 encounters a break event set by debug host 12 indicating that processor 16 should halt execution of the current task, processor 16 enters a hardware state in which it does not fetch further instructions for the current task. In this state, processor 16 can wait for an external command from debug host 12 indicating that execution can be resumed or for an enabled time critical interrupt request. One example of debug state machines maintained by processor 16 are shown and described with respect to FIGS. 4 and 5.

If processor 16 receives a command from debug host 12 indicating that execution should be resumed, processor 16 can resume fetching and executing instructions until another break event is received. Also, processor 16 can be made to execute a single instruction by automatically causing a break event as the first fetched instruction is executed. Further, if an enabled, time critical interrupt is received, processor 16 can execute associated code (typically foreground code as mentioned above) to perform tasks normally associated with servicing that interrupt (e.g., a context save) and can record that it was in a suspended state when the interrupt was taken. After processor 16 has serviced the interrupt and restores the prior context, processor 16 can reenter the suspended state. At this point, processor 16 can resume waiting for a command from debug host 12 to resume execution or for additional enabled, time critical interrupts.

Figure 3:
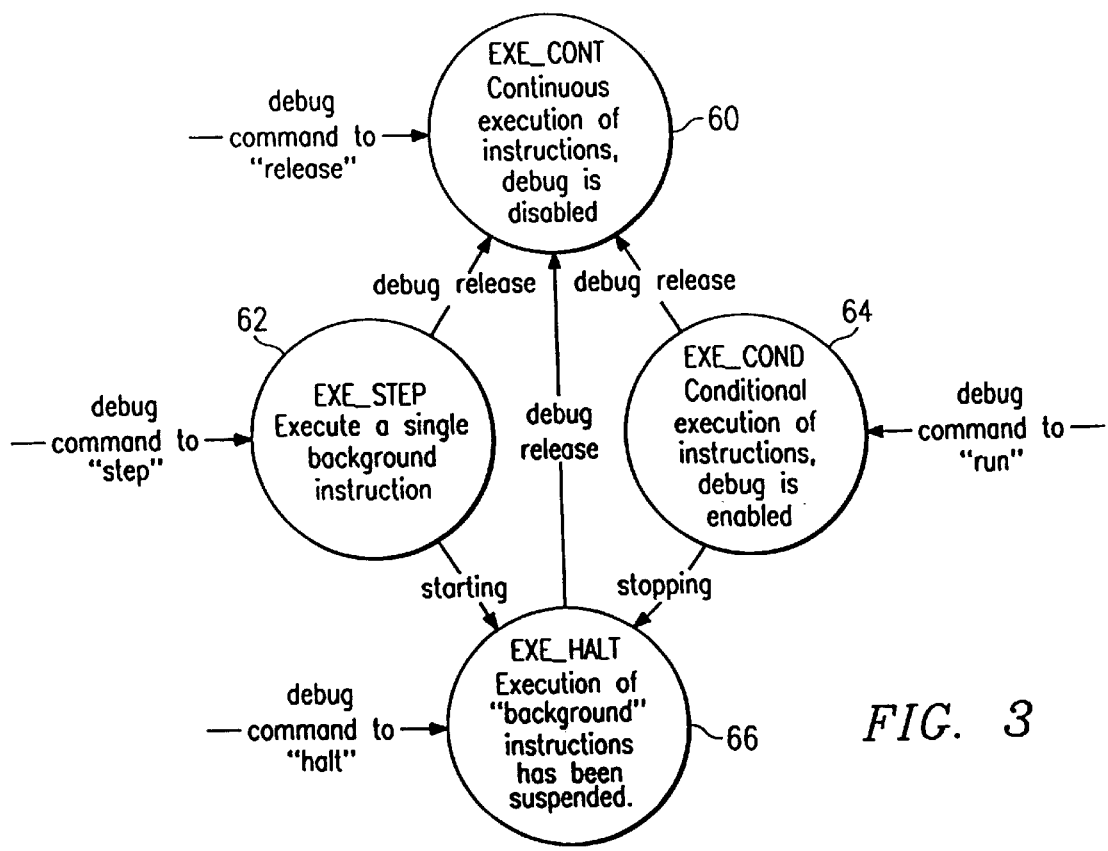
FIG. 3 is a state diagram of one embodiment of a run state machine maintained by the debug circuitry of FIG. 2.

FIG. 3 is a state diagram of one embodiment of a run state machine maintained by the debug circuitry of FIG. 2. In general, the current state of run state machine (RSM) indicates the debug host's execution control directive to the processor. In one implementation, a register can be used to set the state of the run state machine. As shown, the run state machine of FIG. 3 includes a first state 60 (EXE_CONT state), a second state 62 (EXE_STEP state), a third state 64 (EXE_COND state) and a fourth state 66 (EXE_HALT state).

In operation, a debug command from the debug host to "release" the processor places the run state machine in the EXE_CONT state 60. The EXE_CONT state 60 indicates that the processor should be in a normal mode of continuous execution of instructions, and debug is disabled. A debug command to "halt" the processor places the run state machine in the EXE_HALT state 66. The EXE_HALT state 66 indicates that execution of background code instructions should be suspended. A debug command to "step" the processor places the run state machine in EXE_STEP state 62 and indicates that the processor should execute a single background instruction and return to the EXE_HALT state 66. A debug command to "run" the processor places the run state machine in the EXE_COND state 64. The EXE_COND state 64 indicates that the processor should perform conditional execution of instructions with debug enabled.

In general, a debug command can be received while the run state machine is in any state and indicates an absolute transition to the appropriate state. From the EXE_STEP state 62, "starting" execution of an instruction immediately returns the run state machine to the EXE_HALT state 66. This "starting" indicates that an instruction has begun execution, and some internal state transactions of the processor (such taking an interrupt) may be considered as instructions. From the EXE_COND state 64, "stopping" execution of instructions returns the run state machine to the EXE_HALT state 66. This "stopping" indicates that a qualified break event has been received. Qualified break events include reaching a break point instruction and detecting a logic output condition under which it is desired to stop execution so that the state of the processor can be examined. A "debug release", returning the run state machine to the EXE_CONT state 60, indicates that it is no longer desired for the processor to be debugged. This "debug release" may come as a command from the debug host or from logic which has detected the absence or removal of a debug communications channel.

Figure 4:
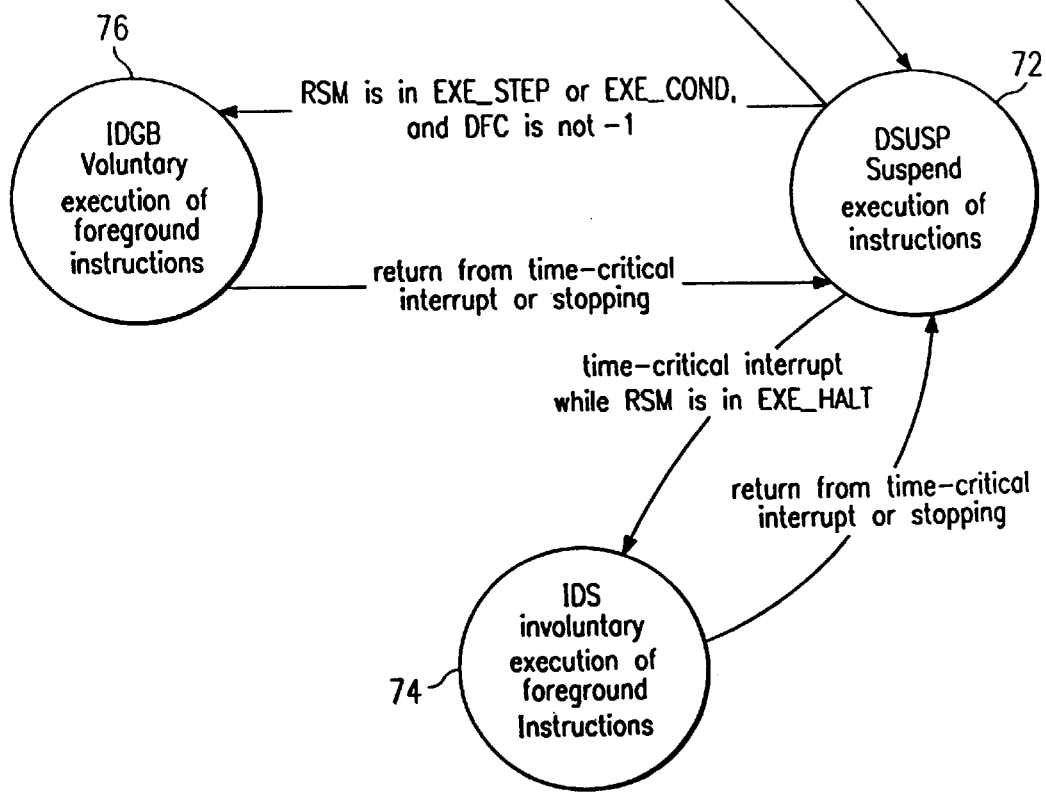
FIG. 4 is a state diagram of one embodiment of an execution state machine maintained by the debug circuitry of FIG. 2.

FIG. 4 is a state diagram of one embodiment of an execution state machine maintained by the debug circuitry of FIG. 2. In general, the current state of execution machine (ESM) indicates the current mode for the processors's execution instructions. In this embodiment, the execution control state machine is controlled indirectly through the run state machine of FIG. 3. As shown, the execution state machine of FIG. 4 includes a first state 70 (EXE state), a second state 72 (DSUSP state), a third state 74 (IDS state) and a fourth state 76 (IDGB state). In this implementation, a debug frame counter (DFC) is used as a counter to help maintain the current state of the execution state machine. The DFC is essentially used to track whether code being debugged is background code or foreground code. The DFC is initialized to −1 and is incremented when transitioning from the DSUSP state 72 to the IDS state 74. The DFC is decremented when transitioning from either the IDS state 74 or the IDGB state 76 to the DSUSP state 72 due to a return from a time critical interrupt (but not when due to stopping execution as by a break event).

In operation, in the EXE state 70, the processor continuously executes background and foreground instructions of the embedded code. The execution state machine is placed in EXE state 70 when the run state machine of FIG. 3 is in the EXE_CONT state 60. In the DSUSP state 72, the processor suspends execution of instructions. The execution state machine is placed in DSUSP state 72 when the run state machine is in the EXE_HALT state 66. From the DSUSP state 72, the execution state machine returns to the EXE state 70 when the run state machine is in the EXE_STEP state 62 or the EXE_COND state 64 and the DFC is −1. If the run state machine is in the EXE_STEP state 62 or the EXE_COND state 64 and the DFC is not −1, then the execution state machine moves to the IDGB state 76. In the IDGB state 76, the processor performs voluntary (from the perspective of the debug host) execution of foreground code instructions (i.e., time critical tasks). From the IDGB state 76, the execution state machine returns to the DSUSP state 72 upon return from a time critical interrupt or stopping (i.e., at a qualified break event). From the DSUSP state 72, if an enabled, time critical interrupt occurs while the run state machine is in the EXE_HALT state 66, the execution state machine moves to the IDS state 74. In the IDS state 74, the processor performs involuntary (from the perspective of the debug host) execution of foreground instructions. From the IDS state 74, the execution state machine returns to the DSUSP state 72 upon return from the time critical interrupt or stopping (i.e., at qualified break event).

In the execution state machine of FIG. 4, a time critical interrupt is an interrupt that is serviced by executing foreground code even while the processor has suspended background or other foreground code execution. One way to make this "time critical" designation is to have a register in which there is field for each interrupt. A bit in the field can indicate whether the associated interrupt is time critical, and another bit can indicate whether the interrupt is enabled. Another method is to have a interrupt enabled register, with a bit per interrupt indicating whether the interrupt is enabled, and a time critical interrupt register, with a bit per interrupt indicating whether the interrupt is time critical.

In the embodiment of FIG. 4, the execution state machine indicates one of four states for instruction execution by the processor which can be used to allow a debug host to debug embedded background and foreground code. In the EXE state 70, the processor executes instructions according to normal instruction flow. In the DSUSP state 72, the processor has suspended instruction execution, either background code or foreground code. If background code, then debug commands to "step" or "run" will move the state to the EXE state 70. If foreground code, then debug commands to "step" or "run" will move the state to the IDGB state 76. In the IDS state 74, the processor executes the foreground code associated with an enabled, time critical interrupt after having received the interrupt.

Thus, the processor can handle debugging of background code while the processor also services time critical tasks by executing foreground code in response to enabled interrupts. Further, the processor can handle the case where, with multiple sections of time critical code, one section of time critical code can be executed while another is stopped and debugged.

Although the present invention has been described in detail, it should be understood that various changes, substitutions and alterations can be made thereto without departing from the sphere and scope of the invention as defined by the appended claims.

What is claimed is:

1. A processor having real-time execution control for debug functions, comprising:

processor circuitry operable to execute embedded code, the embedded code including background code and foreground code; and debug circuitry interfacing with the processor circuitry and operable to communicate with a debug host;

the debug circuitry operable to receive a debug halt command from the debut host; and after receipt of the debug halt command, the processor circuitry operable to suspend execution of the embedded code to allow debug of the embedded code;

the processor circuitry further operable, while execution of the embedded code is suspended, to respond to an enabled interrupt by executing foreground code associated with the enabled interrupt;

wherein the debug circuitry has a run state machine, a current state of the run state machine based upon debug commands received from the debug host and indicating execution control directives by the debug host; and the processor circuitry has an execution state machine, a current state of the execution state machine based upon the current state of the run state machine and indicating execution of instructions by the processor circuitry;

wherein the execution state machine has four states: an execute state, a suspend state, a voluntary foreground code execution state, and an involuntary foreground code execution state;

wherein the processor suspends execution of the embedded code when the current state of the execution state machine is the suspend state;

wherein the processor circuitry is operable to respond to an enabled time critical interrupt that occurs while the execution state machine is in the suspend state by moving to the involuntary foreground code state and executing foreground code associated with the interrupt.

2. The processor of claim 1, wherein the processor circuitry is operable to respond to a break event that occurs during execution of the foreground code associated with the interrupt by moving to the suspend state to allow debug of the foreground code.

3. The processor of claim 2, wherein the processor circuitry is operable to respond to a second enabled interrupt that occurs during debug of the foreground code by moving to the involuntary foreground code state and executing additional foreground code associated with the interrupt.

4. A method for real-time execution control of a processor for debug function, comprising:

receiving a debug halt command in debug circuitry, the debug halt command communicated by a debug host;

after receiving the debug halt command, suspending execution of embedded code by processor circuitry to allow debug of the embedded code, the embedded code including background code and foreground code; and while execution of the embedded code is suspended, responding to an enabled interrupt by executing foreground code associated with the enabled interrupt;

maintaining a run state machine, a current state of the run state machine based upon debug commands received from the debug host and indicating execution control directives by the debug host;

maintaining an execution state machine, a current state of the execution state machine based upon the current state of the run state machine and indicating execution of instruction by the processor circuitry;

wherein the execution state machine has four states: an execute state, a suspend state, a voluntary foreground code execution state, and an involuntary foreground code execution state;

wherein execution of the embedded code is suspended when the current state of the execution state machine is the suspend state;

wherein maintaining the execution state machine comprises the steps of:

responding to an enabled interrupt that occurs while the execution state machine is in the suspend state by moving to the involuntary foreground code state.

5. The method of claim 4, wherein maintaining the execution state machine further comprises responding to a break event that occurs during execution of the foreground code associated with the interrupt by moving to the suspend state to allow debug of the foreground code.

6. The method of claim 5, wherein maintaining the execution state machine further comprises:

responding to a second enabled interrupt that occurs during debug of the foreground code by moving to the involuntary foreground code state; and executing additoinal foreground code associated with the interrupt.

* * * * *